Jan. 18, 1966     J. P. ANGELLO     3,230,452
TEST APPARATUS FOR PLOTTING THE LOAD CHARACTERISTIC CURVES OF
LOW POWER DIRECT CURRENT POWER SOURCES
Filed March 19, 1962

*INVENTOR,*
JOSEPH P. ANGELLO.

BY *Jack H. Linscott*

ATTORNEY.

3,230,452
TEST APPARATUS FOR PLOTTING THE LOAD CHARACTERISTIC CURVES OF LOW POWER DIRECT CURRENT POWER SOURCES
Joseph P. Angello, Irvington, N.J., assignor to the United States of America as represented by the Secretary of the Army
Filed Mar. 19, 1962, Ser. No. 180,907
6 Claims. (Cl. 324—158)
(Granted under Title 35, U.S. Code (1952), sec. 266)

The invention described herein may be manufactured and used by or for the Government for governmental purposes, without payment of any royalty thereon.

This invention relates to test equipment, and more particularly to test equipment which is useful for large scale inspection of direct-current sources of relatively small power.

The circuit to be described herein has been designed so that the load characteristic curves (open-circuit to short-circuit) of direct-current power sources can be plotted by an x–y recorder. Power sources such as solar cells, thermionic diodes, thermoelectric couples and other direct-current sources may be tested by this circuit.

This invention represents an advancement in test facilities and procedure. The specific advantage of the invention lies in the shortening of time required to test a power source, and the elimination of human errors as compared to a point-by-point measurement of load characteristics. In comparing this invention with prior methods of evaluating direct-current sources, a silicon pn junction solar cell will be considered by way of example, but this example is not intended to limit the invention in its extent of use. A prior method of evaluating such cells involved taking point-by-point current and voltage meter readings, which take about 10 minutes per cell, and often included reading errors. Results are usually plotted on graph paper, taking at least another 10 minutes. It is estimated that the circuit of this invention saves from 20 to 30 minutes of a technician's time per unit over the point-by-point measurement of characteristics. The shorter time required also permits quasi-steady-state plots in cases where conditions are changing. Previous circuits which attempted to increase the testing speed for cells are more elaborate than this invention and have required more precise adjustment of circuit components.

Therefore, an object of this invention is to provide a circuit for quickly recording the load characteristics of low power direct-current sources.

Another object is to provide a testing circuit which is an improvement and simplification of the prior art.

A more specific object is to provide test equipment which is useful for large scale inspection of low power direct-current sources.

These and other objects and improvements will become apparent from the following discussion of the drawings in which.

Figure 1:
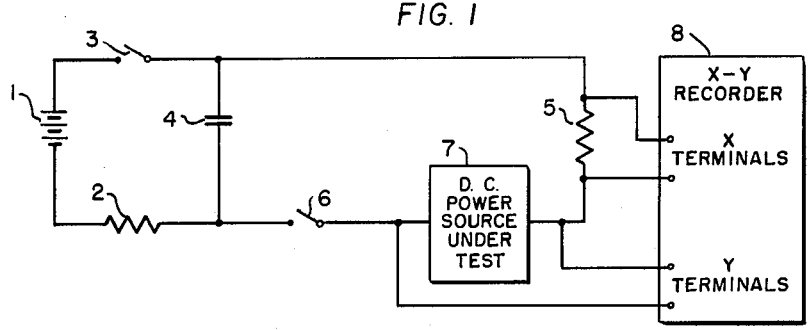
FIGURE 1 shows a circuit diagram of the test equipment of this invention.

Referring to FIGURE 1, a direct-current power supply 1, a time-constant resistor 2, a switch 3 and a capacitor 4 are connected in series. Serially connected across capacitor 4 are a time-constant resistor 5, a switch 6 and the direct-current power source 7 to be tested. The source 7 may be a solar cell, thermionic diode, thermoelectric couple or other type of relatively low power, direct-current source. The x-terminals of an x–y recorder are connected across resistor 5, and the y-terminals are connected across the particular source 7 under test. Resistors 2 and 5 and capacitor 4 are selected to provide a time-constant which does not exceed the sensitivity sweep of the recorder. The minimum voltage of power supply 1 is determined by the magnitude of the voltage producer by the power source under test and must exceed the voltage of such source. The value of resistor 5 is chosen to calibrate the recorder.

Figure 2:
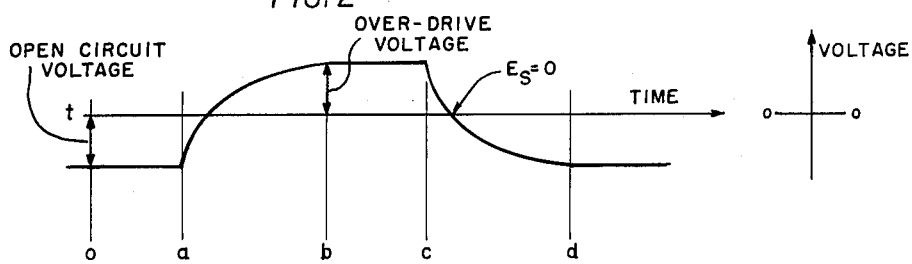
FIGURE 2 is a graph showing the voltage across the power source under test with respect to time.

The operation of the circuit will be now considered, reference being made to FIGURE 2 which shows the voltage across source 7 plotted against time. The curves discussed in the following description were obtained in testing a silicon solar cell, but any of the previously mentioned sources could have been used. With switch 3 open and switch 6 closed, at $t=o$ the x–y recorder plots the open-circuit voltage of the source under test. At $t=a$ switch 3 is closed and the voltage across the source 7 rises according to the time constant of resistor 2 and capacitor 4. The voltage then levels off above the zero reference at a voltage determined by power supply 1. At $t=b$ the voltage has leveled off at the over-drive voltage, and is maintained by supply 1. At $t=c$ switch 3 is opened and the voltage across source 7 decays according to the time constant of resistor 5 and capacitor 4. At the point represented as $E_s=o$ short-circuit current is recorded. At $t=d$ the voltage has returned to open-circuit voltage.

Tests on solar cells are conducted in natural light or under an artificial source. The light intensity varies from low levels to very high levels. When it is desirable to rapidly record the open-circuit voltage of the power source, switch 6 is opened. This eliminates the waiting time which would be encountered as the voltage leveled off at open-circuit voltage due to the time constant of the circuit. Also, with switch 6 open, rapid changes in open circuit voltage could be recorded, as would be encountered during changes of light intensity upon a photocell, for example.

When the magnitude of the power supply voltage is just enough to drive the direct-current power source to the short circuit condition, the initial rate of decrease of current is too rapid for the slewing speed of the x–y recorder. The recorder will not record the load characteristic curve until the slope of the decay curve of the circuit drops below the slewing speed of the recorder. Because of this, the magnitude of the charge voltage should be great enough to over-drive the short-circuit requirement of the direct-current source under test. It does not matter how much the power supply over-drives the sweep since the short-circuit current is not recorded until the voltage across the power source 7 is zero.

Figure 3:
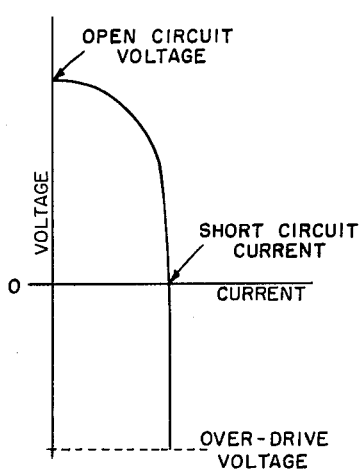
FIGURE 3 is a graph showing the load characteristics of a silicon solar cell as plotted on an x–y recorder.

FIGURE 3 shows a plot of the load characteristics of a silicon solar cell as recorded on the x–y recorder. This curve was recorded using the available sunlight in the room. As is evident from the graph, the open-circuit voltage and the short-circuit current may be read directly from the graph. The particular x–y recorder used in this test was the Model No. 2–D "Autograf" manufactured by the F. L. Moseley Company.

Figure 4:
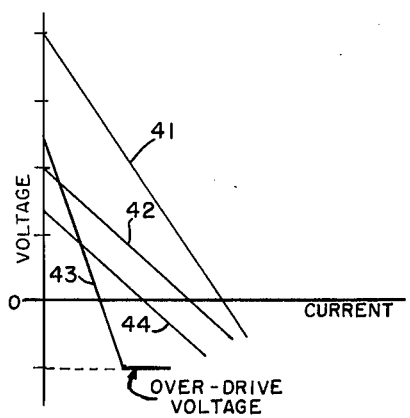
FIGURE 4 is a graph of the load characteristics of a thermoelectric generator.

FIGURE 4 shows a graph of the load characteristic curves of a thermoelectric generator. The generator has an electrical heater for attaining the temperature at the hot junction of the thermocouple. Curves 41 and 42 were recorded at thermal equilibrium. The output voltage of the thermocouple could be either 2 or 4 volts and was controlled by a switch. Curve 41 was obtained by utilizing the 4 volt output terminal of the thermocouple while curve 42 represents the 2 volt output terminal. Curves 43 and 44 were obtained by using the 4 volt and 2 volt output terminals respectively after the heater voltage was turned off.

There has thus been disclosed a method and means whereby the load characteristic curves (open-circuit to short-circuit) of direct-current sources may be easily and quickly recorded.

Obviously other modifications and variations of the present invention are possible in light of the above teachings. It is therefore to be understood that, within the scope of the appended claims, the invention can be practiced otherwise than as specifically described.

What is claimed is:

1. A test circuit for a low power direct-current source comprising: a direct-current power supply, the voltage of which is greater than that of said low power direct-current source, a switch, a capacitor and a first resistor connected in series; a second resistor and said low power source serially connected across said capacitor, the positive terminal of said low power source being connected to the negative terminal of said direct-current power supply so that said direct-current power supply over-drives said low power direct-current source as said capacitor charges; an x–y recorder having first and second pairs of input terminals; said first pair of input terminals being connected across said second resistor and said second pair of input terminals being connected across said low power source.

2. The test circuit of claim 1 in which a switch is connected in series with said low power source and said second resistor so that the open-circuit voltage of said low power source can be quickly determined.

3. The test circuit of claim 1 in which said low power source is a solar cell.

4. The test circuit of claim 1 in which said low power source is a thermoelectric couple.

5. The test circuit of claim 1 in which said low power source is a thermionic diode.

6. A test circuit for testing a low power direct-current source consisting of: a direct-current power supply, the voltage of which is greater than that of said low power source under test, a first switch, a capacitor and a first resistor connected in series; a second resistor, a second switch and said low power source serially connected across said capacitor, the positive terminal of said low power source being connected to the negative terminal of said direct-current power supply so that said direct-current power supply over-drives said low power source as said capacitor charges; and x–y recorder means connected to said second resistor and to said low power source for recording the open circuit voltage and short circuit current of said low power source.

References Cited by the Examiner

UNITED STATES PATENTS 2,835,862   5/1958   McNutt _____ 320—48 X

FOREIGN PATENTS 631,459   11/1949   Great Britain.

WALTER L. CARLSON, *Primary Examiner.*

E. L. STOLARUN, *Assistant Examiner.*